(12) United States Patent
Lennen

(10) Patent No.: US 7,362,795 B1
(45) Date of Patent: Apr. 22, 2008

(54) METHOD AND APPARATUS FOR ACQUISITION AND TRACKING OF GPS SATELLITES AT LOW SIGNAL TO NOISE LEVELS

(75) Inventor: Gary R. Lennen, Cupertino, CA (US)

(73) Assignee: Trimble Navigation Ltd, Sunnyvale, CA (US)

( * ) Notice: Subject to any disclaimer, the term of this patent is extended or adjusted under 35 U.S.C. 154(b) by 710 days.

(21) Appl. No.: 10/811,620

(22) Filed: Mar. 28, 2004

(51) Int. Cl.
*H04B 1/707* (2006.01)

(52) U.S. Cl. ...................................... 375/149; 375/150

(58) Field of Classification Search ........ 375/140–142, 375/145, 147, 149, 150; 370/320, 335, 342, 370/441
See application file for complete search history.

(56) References Cited

U.S. PATENT DOCUMENTS 6,028,883 A    2/2000  Tiemann et al.
6,151,353 A *  11/2000 Harrison et al. ............ 375/136
6,516,021 B1 * 2/2003  Abbott et al. ............... 375/150
7,221,696 B1 * 5/2007  McLeod et al. ............. 375/140

\* cited by examiner

*Primary Examiner*—Don N Vo
(74) *Attorney, Agent, or Firm*—Boris G. Tankhilevich

(57) ABSTRACT

A method of acquisition a signal having a low signal to noise ratio (SNR). The method comprises the steps of: (A) detecting a non-zero power in the signal having the low SNR during a power detect process; (B) receiving the signal having the low SNR by using a signal receiver having an antenna; (C) accumulating a plurality of digital samples of the signal within a predetermined period of time; and (D) employing an algorithm to correct defects in reception of the signal having the low SNR by minimizing a set of parameters selected from the group consisting of: {a carrier frequency offset; a code phase offset; and a data bit misalignment}.

10 Claims, 12 Drawing Sheets

METHOD AND APPARATUS FOR ACQUISITION AND TRACKING OF GPS SATELLITES AT LOW SIGNAL TO NOISE LEVELS

BACKGROUND OF THE INVENTION

1. Field of the Invention

The present invention relates to the field of acquiring and tracking satellite signals, and more specifically, to the field of acquiring and tracking satellite signals having a low signal-to-noise ratio (SNR).

2. Discussion of the Prior Art

Typically, GPS satellites transmit signal power such that a receiver on the surface of the Earth with clear view of the sky should expect to receive signal power of at least −130 dBm. If 'u', is a real, nonnegative, power signal (units of watts), the dBm conversion is equivalent to performing the dB operation after converting the input to milliwatt:

$$y=10*\log 10(u)+30 \qquad \text{(Eq. 1)}$$

For the transmit signal power details, please, see "GPS Interface Control Document", ICD-GPS-200, IRN-200B-PR-OOJ, Rev. B-PR, U.S. Air Force, Jul. 1, 1992.

The received signal power may be translated into an SNR across each 50 Baud data bit by taking into account noise sources, receiver losses and bandwidths. The received signal having −130 dBm power corresponds to approximately to a signal having 28 dB SNR across each data bit. At these SNRs levels data the bit error rate (BER) is relatively low, the bit errors are very rare and can be easily detected and corrected via, for example, the data's forward error correction (FEC) capabilities.

In recent years GPS applications have grown into areas where receivers are required to operate successfully i.e. provide position solution, under low SNR conditions. These low SNR situations include, for example, (1) indoor operations; and/or (2) partial signal block conditions. For instance, in a situation where a number of satellites have high and low SNRs, in a situation where satellite signals are partially blocked (like a cell phone capable of receiving partially blocked satellite signals), the received signal power is expected to be substantially reduced. Another important application where the received signal power is expected to be substantially reduced is when one, being indoors, needs to get an accurate time reading from GPS by getting a signal from only one satellite, whereas the position is assumed to be already known. The received signal power target for indoor applications and other partially blocked conditions is better than −150 dBm, that is (20-30) dB lower than the nominal signal power, thus requiring innovative signal acquisition and tracking techniques.

There are a number of operations required of a GPS receiver to successfully use a satellite in a position solution under low SNR conditions. One of these operations is finding the satellite's signal power via a search of the satellite's carrier frequency and code phase bins. This subject area is covered in the U.S. patent application Ser. No. 09/512,243 "Method and Apparatus for Fast Acquisition and Low SNR Tracking in Satellite Positioning System Receivers" by Gary Lennen. The U.S. patent application Ser. No. 09/512,243 "Method and Apparatus for Fast Acquisition and Low SNR Tracking in Satellite Positioning System Receivers" is incorporated herein in its entirety and is referred to hereafter as the patent application #1.

Once the satellite signal power has been found (by applying, for instance, the method of patent application #1), the receiver is required to close carrier and code tracking loops, to align 50 Baud data bit edges, and to attempt a data decode operation. Because of the low SNR conditions, each of these operations should be performed substantially optimally, that is, by optimal usage of the available signal power and without unnecessarily introducing any signal loss. The optimal usage of the available signal power has additional benefits, like optimization of the time and reliability in obtaining a position fix, minimization of the energy used per position fix, and increase in the responsiveness of the GPS receiver.

SUMMARY OF THE INVENTION

To address the shortcomings of the available art, the present invention provides inventive ways to acquire and track signals having a low SNR.

One aspect of the present invention is directed to a method of acquisition of a signal having a low signal to noise ratio (SNR).

In one embodiment, the method of the present invention comprises the following steps: (A) detecting a non-zero power in the signal having the low SNR during a power detect process; (B) receiving the signal having the low SNR by using a signal receiver having an antenna; (C) accumulating a plurality of digital samples of the signal within a predetermined period of time; (D) employing an algorithm to correct defects in reception of the signal having the low SNR by minimizing a set of parameters selected from the group consisting of: {a carrier frequency offset; a code phase offset; and a data bit misalignment}; and (E) performing tracking of the corrected received signal having the low SNR.

The signal having the low SNR is emanating from a source selected from the group consisting of {a GPS satellite; a GLONASS satellite; a GALILEO satellite; and a pseudolite}.

In one embodiment of the present invention, the step (C) of accumulating the plurality of digital samples of the signal further includes the step of a memory logging process further comprising the steps of: (C1) employing an integer N plurality of In phase channel correlators configured to accumulate a plurality of I digital samples of the incoming signal in an In phase (I) channel, and employing the integer N plurality of Quadrature channel correlators configured to accumulate a plurality of Q digital samples of the incoming signal during a predetermined time period; (C2) writing into a first memory block a plurality of I channel digital samples of the incoming signal accumulated during the predetermined time period, and writing into a second memory block a plurality of Q channel digital samples of the incoming signal accumulated during the predetermined time period to complete a loop cycle of the memory logging process; (C3) adjusting a code phase by using an expected code frequency offset deduced from a carrier frequency offset given by the power detect process to maintain a code phase of the incoming signal during the memory logging process; (C4) counting a number of completed loop cycles; (C5) if the number of completed loop cycles of the memory logging process is less than a predetermined integer number M of loop cycles, repeating the steps (C1-C5); and (C6) if a number of the completed loop cycles of the memory logging process is equal to the predetermined integer number M of loop cycles, ending the memory logging process.

In one embodiment of the present invention, the step (D) of employing the algorithm to correct defects in reception of the signal having the low SNR further includes the step (D2)

of performing a carrier frequency false lock detection process to maximize the probability that the signal receiver is locked on a signal emanating from a signal source having a maximum signal power.

In one embodiment of the present invention, the step (D) of employing the algorithm to correct defects in reception of the signal having the low SNR further includes the step (D3) of performing an iterative optimization of a carrier frequency offset.

In one embodiment of the present invention, the step (D3) of performing the iterative optimization of the carrier frequency offset further comprises the steps of: (D3,1) selecting a carrier frequency offset from a set of data stored in the first memory and second memory; (D3,2) reading an integer K plurality of stored I digital samples having a first carrier frequency from the first memory and reading the integer K plurality of stored Q digital samples having the first carrier frequency from the second memory by using a microprocessor; (D3,3) performing a complex mix operation on the read values of the K plurality of stored I digital samples and the integer K plurality of stored Q digital samples having the first carrier frequency to generate a set of new values of the K plurality of I digital samples and the integer K plurality of Q digital samples having a second carrier frequency; (D3,4) replacing in the first memory the integer K plurality of originally stored I digital samples having the first carrier frequency by the new values of the integer K plurality of I digital samples having the second carrier frequency, and replacing in the second memory the integer K plurality of originally stored Q digital samples having the first carrier frequency by the new values of the integer K plurality of Q digital samples having the second carrier frequency; and (D3,5) repeating the steps (D3,2)-(D3,4) until all I digital samples in the first memory and all Q digital samples in the second memory are processed.

In another embodiment of the present invention, the step (D3) of performing the iterative optimization of the carrier frequency offset further comprises the steps of: (D3,6) selecting a carrier frequency offset from a set of data stored in the first memory and second memory; (D3,7) reading an integer K plurality of stored I digital samples having a first carrier frequency from the first memory and reading the integer K plurality of stored Q digital samples having the first carrier frequency from the second memory by using a microprocessor; (D3,8) performing a complex mix operation on the read values of the K plurality of stored I digital samples and the integer K plurality of stored Q digital samples having the first carrier frequency to generate a set of new values of the K plurality of I digital samples and the integer K plurality of Q digital samples having a second carrier frequency; and (D3,9) using the set of new values of the K plurality of I digital samples having the second carrier frequency and the integer K plurality of Q digital samples having the second carrier frequency for further processing.

In one embodiment of the present invention, the step (D) of employing the algorithm to correct defects in reception of the signal having the low SNR further includes the steps of: (D4) running a data transition algorithm to minimize the data bit misalignment parameter; (D5) running a carrier frequency estimation algorithm to minimize the carrier frequency offset parameter; (D6) running a code phase estimation algorithm to minimize the code phase offset; and (D7) repeating the steps (D4-D6) until each parameter selected from the group consisting of: {the carrier frequency offset; the code phase offset; and the data bit misalignment} converges on the corresponding minimized parameter selected from the group consisting of: {the minimized carrier frequency offset; the minimized code phase offset; and the minimized data bit misalignment}.

In one embodiment of the present invention, the step (D4) of running the data transition algorithm to minimize the data bit misalignment parameter further comprises the steps of: (D4,1) determining the power of the difference between adjacent correlations taken over the entire correlator data set stored in the first memory and stored in the second memory; and (D4,2) summing the power of the difference between the adjacent correlations determined in the step (D4,1) over all possible data bit positions. The data transition algorithm cancels or enhances the received signal based on a presence or on absence of a data bit transition.

In one embodiment of the present invention, the step (D5) of running the carrier frequency estimation algorithm to minimize the carrier frequency offset parameter further comprises the steps of: (D5,1) accumulating the I and Q memory samples across a bit time period; (D5,2) selecting the I and Q memory samples closest to a correlation peak; (D5,3) estimating the phase of the carrier signal using the I and Q memory samples closest to the correlation peak; (D5,4) estimating the frequency of the carrier signal by using difference sequential carrier measurements; (D5,5) averaging the carrier frequency estimates across the entire data stored in the first and second memory; and (D5,6) using the resulting averaged frequency offset value for subsequent data processing.

In one embodiment of the present invention, the step (D6) of running the code phase estimation algorithm to minimize the code phase offset further comprises the steps of: (D6,1) accumulating an Early, Punctual, and Late correlator values over the predetermined memory logging time period in both I and Q channels; (D6,2) computing a correlation vector magnitude for each Early, Punctual, and Late accumulated correlator values for each bit period; (D6,3) summing the correlation vector magnitude for each Early, Punctual, and Late correlators over the predetermined memory logging time period to compute a peak equation; wherein the peak equation represents an optimized direction and an optimized size of a code phase error; (D6,4) using the peak equation to compute a code phase error; and (D6,5) using the code phase error to achieve an optimized code tracking function.

In one embodiment of the present invention, the step (E) of performing tracking of the corrected received signal having the low SNR further includes the steps of: (E1) loading the first memory block and the second memory block with a set of current I and Q digital samples of the received signal collected during the predetermined time period; (E2) running the data transition algorithm to minimize the data bit misalignment parameter; running the carrier frequency estimation algorithm to minimize the carrier frequency offset parameter; and running the code phase estimation algorithm to minimize the code phase offset thus correcting the received signal having the low SNR; (E3) performing a tracking function of the received corrected signal having the low SNR by applying the minimized carrier frequency offset and applying the minimized code phase offset to a Digital Signal Processing (DSP) block; and (E4) repeating the steps ((E1)-(E3)) until the tracking of the received corrected signal having the low SNR is continued.

In one embodiment of the present invention, the step (E3) of performing the tracking function of the received corrected signal having the low SNR further includes the steps of: (E3,1) closing a code tracking loop; (E3,2) closing a carrier tracking loop; (E3,3) aligning data bit edges; and (E3,4) performing a data extraction operation and performing a pseudo range measurement operation by using the received corrected signal having the low SNR.

Another aspect of the present invention is directed to an apparatus for acquisition of a signal having a low signal to noise ratio (SNR).

In one embodiment of the present invention, the apparatus comprises: (A) a means for detecting a non-zero power in the signal having the low SNR during a power detect process; (B) a means for receiving the signal having the low SNR; (C) a means for accumulating a plurality of digital samples of the signal within a predetermined period of time; (D) a means for correcting defects in reception of the signal having the low SNR by minimizing a set of parameters selected from the group consisting of: {a carrier frequency offset; a code phase offset; and a data bit misalignment}; and (E) a means for tracking the corrected received signal having the low SNR.

In one embodiment of the present invention, the means (C) for accumulating the plurality of digital samples of the signal further includes: (C1) an integer N plurality of Inphase channel correlators configured to accumulate an integer N plurality of digital samples of the incoming signal in an Inphase (I) channel, and the integer N plurality of Quadrature channel correlators configured to accumulate a first plurality of digital samples of the incoming signal during a predetermined time period; (C2) a first memory block configured to store a plurality of I channel digital samples of the incoming signal accumulated during the predetermined time period, and a second memory block configured to store a plurality of Q channel digital samples of the incoming signal accumulated during the predetermined time period; and (C3) a counter configured to count a number of complete loop cycles.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Figure 1:
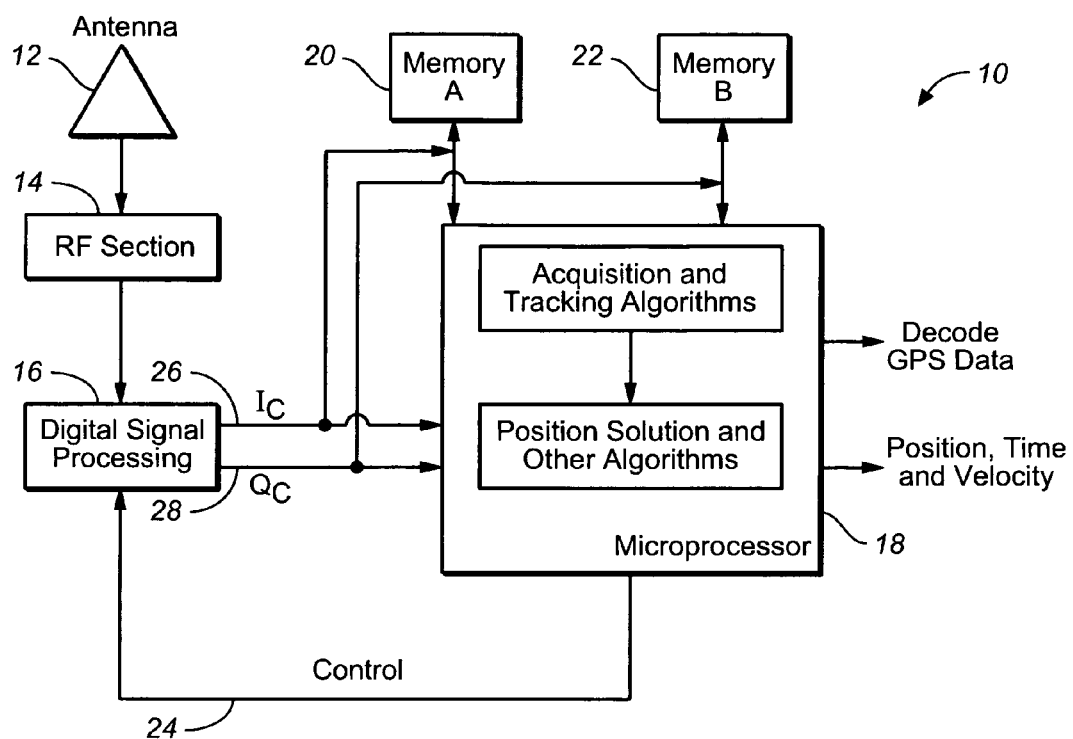
FIG. 1 depicts an apparatus of the present invention for acquisition of a signal having a low signal to noise ratio (SNR).

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

For the purposes of the present invention, the signal having the low SNR is emanating from a source selected from the group consisting of {a GPS satellite; a GLONASS satellite; a GALILEO satellite; and a pseudolite}.

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency $f1=1575.42$ MHz (approximately nineteen centimeter carrier wavelength) and an L2 signal having a frequency $f2=1227.6$ MHz (approximately twenty-four centimeter carrier wavelength). These two frequencies are integral multiplies f1=1,540 f0 and f2=1,200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes and accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k=(1, 2, . . . 24) is the channel or satellite number. These frequencies lie in two bands at 1.597-1.617 GHz (L1) and 1,240-1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals. Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

GALILEO will be Europe's own global navigation satellite system, providing a highly accurate, guaranteed global positioning service under civilian control. It will be interoperable with GPS and GLONASS, the two other global satellite navigation systems. A user will be able to take a position with the same receiver from any of the satellites in any combination. By offering dual frequencies as standard, however, GALILEO will deliver real-time positioning accuracy down to the meter range, which is unprecedented for a publicly available system. It will guarantee availability of the service under all but the most extreme circumstances and will inform users within seconds of a failure of any satellite. This will make it suitable for applications where safety is crucial, such as running trains, guiding cars and landing aircraft.

The first experimental satellite, part of the so-called GALILEO System Test Bed (GSTB) will be launched in the second semester of 2005. The objective of this experimental satellite is to characterize the critical technologies, which are already under development under ESA contracts. Thereafter up to four operational satellites will be launched in the time frame 2005-2006 to validate the basic GALILEO space and related ground segment. Once this In-Orbit Validation (IOV) phase has been completed, the remaining satellites will be installed to reach the Full Operational Capability (FOC) in 2008.

The fully deployed GALILEO system consists of 30 satellites (27 operational+3 active spares), positioned in three circular Medium Earth Orbit (MEO) planes in 23616 km altitude above the Earth, and at an inclination of the orbital planes of 56 degrees with reference to the equatorial plane. Once this is achieved, the GALILEO navigation signals will provide a good coverage even at latitudes up to 75 degrees north, which corresponds to the North Cape, and beyond. The large number of satellites together with the optimization of the constellation, and the availability of the three active spare satellites, will ensure that the loss of one satellite has no discernible effect on the user.

Two GALILEO Control Centers (GCC) will be implemented on European ground to provide for the control of the satellites and to perform the navigation mission management. The data provided by a global network of twenty GALILEO Sensor Stations (GSS) will be sent to the GALILEO Control Centers through a redundant communications network. The GCC's will use the data of the Sensor Stations to compute the integrity information and to synchronize the time signal of all satellites and of the ground station clocks. The exchange of the data between the Control Centers and the satellites will be performed through so-called up-link stations. Five S-band up-link stations and 10 C-band up-link stations will be installed around the globe for this purpose. As a further feature, GALILEO will provide a global Search and Rescue (SAR) function, based on the operational Cospas-Sarsat system. To do so, each satellite will be equipped with a transponder, which is able to transfer the distress signals from the user transmitters to the Rescue Co-ordination Center, which will then initiate the rescue operation. At the same time, the system will provide a signal to the user, informing him that his situation has been detected and that help is under way. This latter feature is new and is considered a major upgrade compared to the existing system, which does not provide a feedback to the user.

A Satellite Positioning System (SATPS), such as the Global Positioning System (GPS), or the Global Orbiting Navigation Satellite System (GLONASS), or the combined GPS-GLONASS, (or the future GALILEO), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites. The range ($r_i$) between the location of the i-th SATPS satellite and the SATPS receiver is equal to the speed of light c times ($t_i$), wherein ($t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite. After the SATPS receiver determines the coordinates of the i-th SATPS satellite by demodulating the transmitted ephemeris parameters, the SATPS receiver can obtain the solution of the set of the simultaneous equations for its unknown coordinates ($x_0$, $y_0$, $z_0$) and for unknown time bias error (cb). The SATPS receiver can also determine velocity of a moving platform.

Pseudolites are ground-based transmitters that can be configured to emit GPS-like signals for enhancing the GPS by providing increased accuracy, integrity, and availability. Accuracy improvement can occur because of better local geometry, as measured by a lower vertical dilution of precision (VDOP). Availability is increased because a pseudolite provides an additional ranging source to augment the GPS constellation.

Recent advances in Inertial Navigation Systems (INS) technologies makes it feasible to build a very small, low power INS system. Acceleron Technology, Inc., located in San Francisco, Calif., has built small light weight Inertial Navigation System (INS) using three accelerometers to measure three components of the local acceleration vector, three magnetometers to measure three components of the local gravitational vector, plus some software. An accelerometer is a sensor that measures acceleration, speed and the distance by mathematically determining acceleration over time. A magnetometer is a device that measures a local magnetic field. The local gravitational factor can be calculated by using the measured local magnetic field, because the local gravitational field, as well as the local magnetic field, are both defined by the local Earth geometry, as well explained in the book "Applied Mathematics in Integrated Navigation Systems", published by American Institute of Aeronautics and Astronautics, Inc, 2000, by Robert M. Rogers. The "Applied Mathematics in Integrated Navigation Systems" teaches how geometrical shape and gravitational models for representing the Earth are used to provide relationship between ECEF position x-y-z components and local-level latitude, longitude, and attitude positions. The "Applied Mathematics in Integrated Navigation Systems" also teaches how a vehicle's position change in geographical coordinates is related to the local Earth relative velocity and Earth curvature.

The present disclosure focuses on acquisition and tracking of GPS satellites under low SNR conditions. The patent application #1 dealt with the problem of finding satellite signal power under low SNR conditions. The present invention assumes that the satellite power has been detected by some other means, for instance, by using the apparatus fully disclosed in the patent application #1.

In one embodiment, FIG. 1 shows a block diagram of the apparatus 10 of the present invention. The apparatus 10 includes an Antenna 12, RF Section 14, and Digital Signal Processing blocks 16 that are fully disclosed in the patent application #1. The output of the Digital Signal Processing block 16 is processed by the Microprocessor 18 and Memory A 20 and Memory B 22 blocks. A Control line 24 from the Microprocessor block 18 provides a means for altering code phase and carrier frequency, via code and carrier NCOs (Numerically Controlled Oscillators) (not shown). The code and carrier NCOs (Numerically Controlled Oscillators) are fully disclosed in the patent application #1.

Referring still to FIG. 1, the outputs $I_C$ 26 and $Q_C$ 28 are the result of correlating the incoming satellite signal with a locally generated replica of the C/A code transmitted by a particular satellite. Signals $I_C$ 26 and $Q_C$ 28 actually represent multiple correlator outputs. For example, if there are 3 correlators in the in-phase (I) channel they represent correlation results of incoming and locally generated C/A codes at different delay offsets between the two. As an example of a useful naming convention let's call these correlations $I_{Cn}$, where a number of correlators is given by $I_{C1} \ldots I_{Cn}$, 'n' is an integer. Similarly, one can represent quadrature correlations by $Q_{C1} \ldots Q_{Cn}$. The correlations are summations, usually across the C/A code repetition period of 1 millisecond. As an example, the accumulations may be 16-bit signed numbers that are read by the Microprocessor every millisecond. In one embodiment, the present invention includes 6 correlator accumulations, three in each of I and Q channels. In another embodiment, the present invention includes 'n' number of correlator accumulations, 'n' in each I and Q channels.

In one embodiment of the present invention, the correlation accumulations ($I_{C1}$, $I_{C2}$, $I_{C3}$, $Q_{C1}$, $Q_{C2}$, $Q_{C3}$) are processed in such a way that the receiver takes the power detected condition and provides the means to further acquire and track the GPS signals under low SNR conditions. There are different sources of SNR losses after satellite power has been detected but before signal acquisition has been completed. Please, see discussion below.

FIGS. 2 through 6 are used to describe the initial conditions (power detect conditions) for the purposes of the present invention. There are three misalignments that cause SNR loss, carrier frequency offset, code phase offset and 50 Baud data bit offset.

Figure 2:
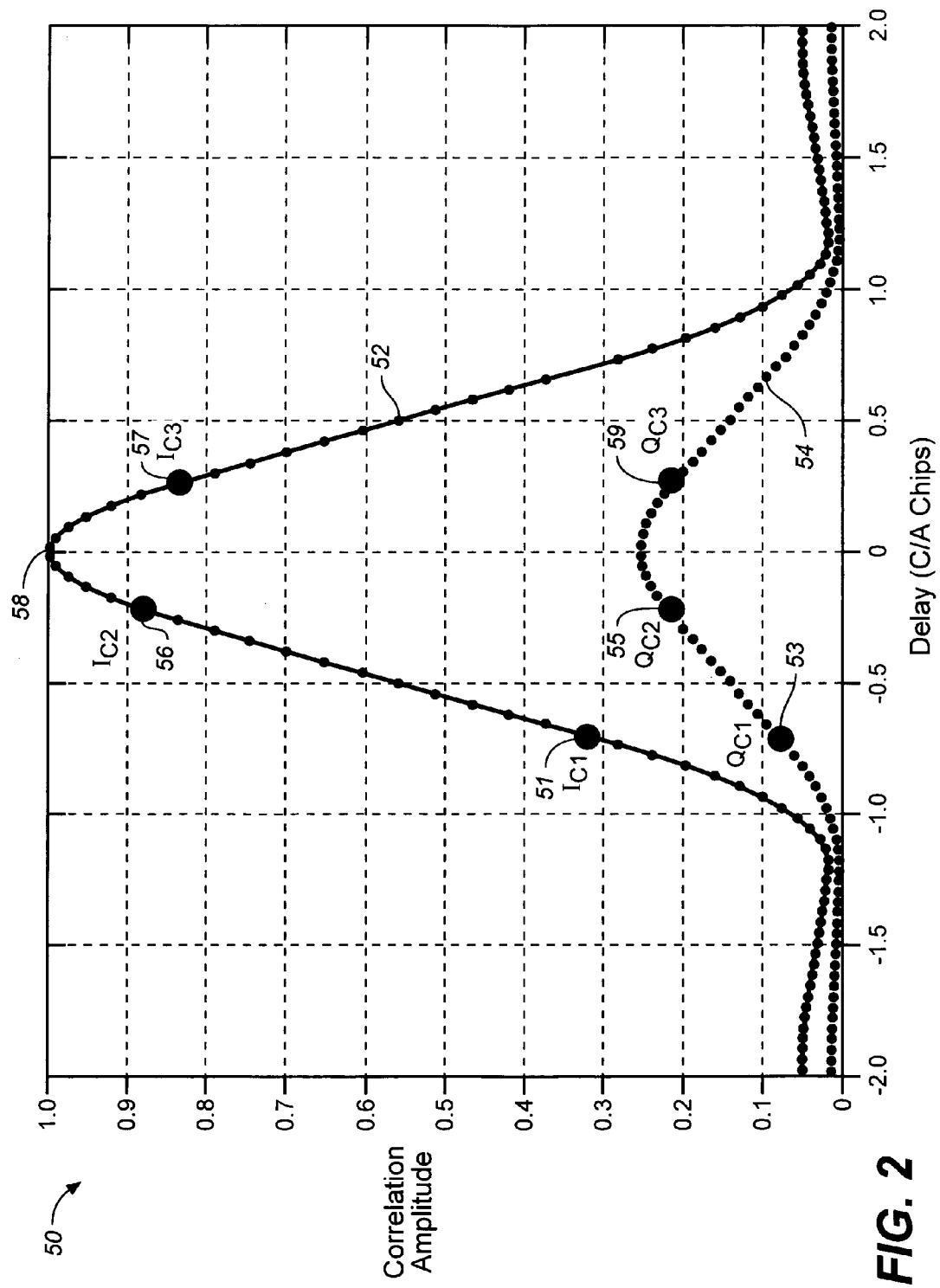
FIG. 2 shows the correlation function developed between the incoming satellite code (C/A code in GPS case) and the locally generated replica.

FIG. 2 shows the correlation function 50 developed between the incoming satellite code (C/A code in GPS case) and the locally generated replica. The receiver does not know yet (after power detect) the time of exact alignment between the two codes. Two correlation functions 52 and 54 are shown for in-phase and quadrature carrier arms. The I correlators 52 are shown to have a larger amplitude than the Q correlators 54, but it could just as easily be the other way around as the carrier phase relationship between the two is not known yet. The maximum SNR is observed on the peak of the correlation functions. The power detect algorithm provides information as to the approximate location of the peak but not exact. $I_{C2}$ (56 of FIG. 2) is the I correlator closest to the peak SNR condition. If the power detect phase used ½ chip spacing for its search then $I_{C2}$ would typically be within ¼ chip of the peak correlation 58. Other spacings are also possible, e.g. 1 chip power search gives $I_{C2}$ typically within ½ chip of correlation peak.

Figure 3:
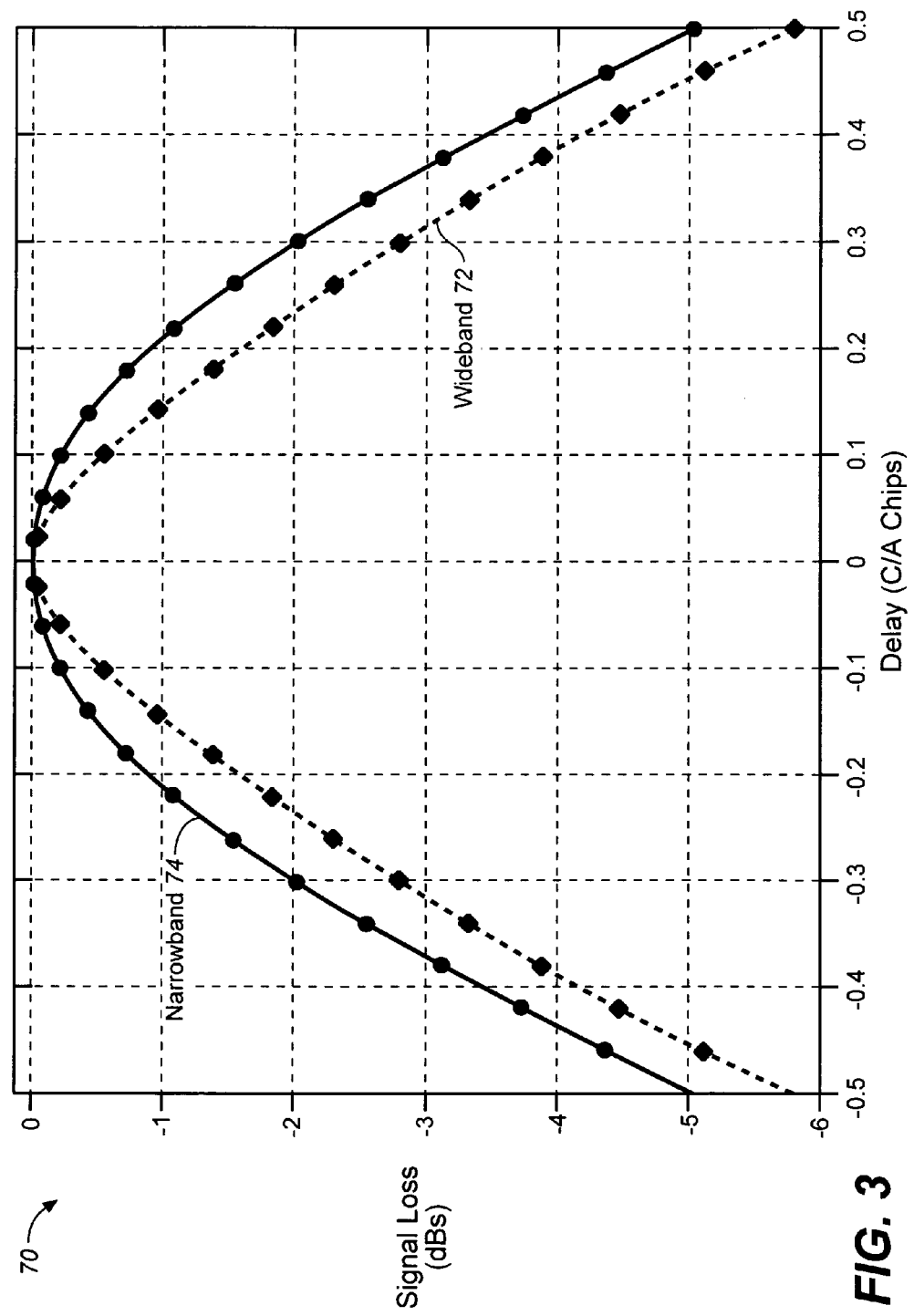
FIG. 3 illustrates the SNR loss versus code phase offset.

FIG. 3 illustrates the SNR loss associated with the $I_{C2}$ correlator (56 of FIG. 2) being offset from the maximum SNR peak (58 of FIG. 2). Two cases are shown, the narrowband case 74 and the wideband case 72. The prior art wideband receiver techniques have been used in GPS to improve the pseudo range fidelity, i.e. by sharpening the correlation peak. A wideband reception would typically use a 20 MHz RF bandwidth. On the other hand, a narrowband reception (typically 2 MHz) is preferable in situations where signal interference and jamming are at issue. The effect of narrowing the RF bandwidth is to round the correlation peaks, as it is clearly demonstrated in FIG. 3. The impact of narrowband and wideband reception techniques are different on the acquisition algorithms of the present invention, particularly with reference to pseudo range measurement and code phase pull-in.

More specifically, FIG. 3 shows an SNR loss of approximately 1.5 dB for a ¼ chip offset for the narrowband case. The wideband case shows a loss of approximately 2 dB at ¼ chip offset. These SNR losses are relative to their respective maximum SNR conditions, and the maximum SNR condition in a wideband case is slightly greater than in a narrowband case. It is therefore the task of the acquisition algorithm to shift the correlators (e.g. $I_{C2}$) closer to the peak correlation to maximize SNR for continuous signal tracking and to improve the pseudo range measurement quality.

Figure 4A:
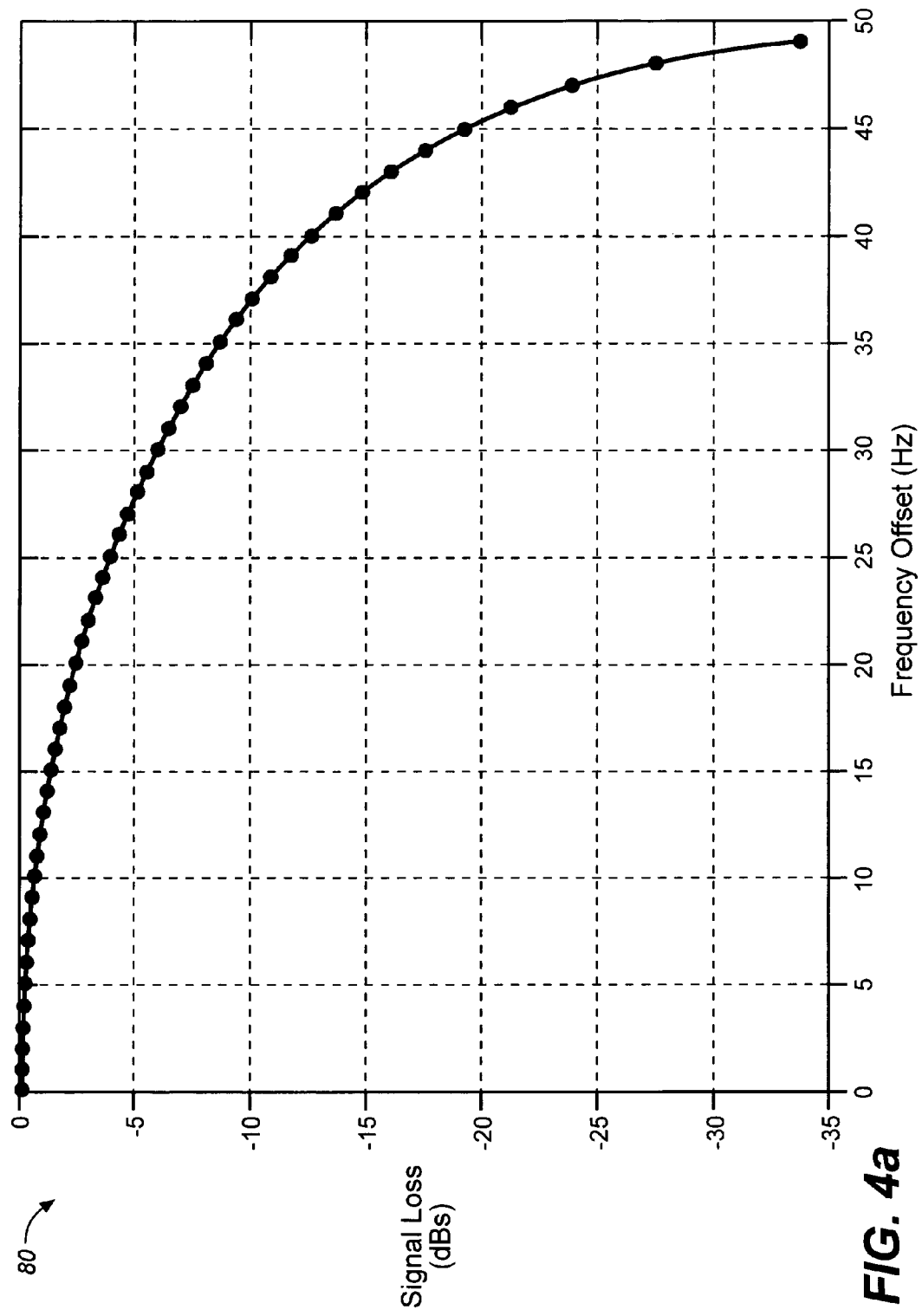
FIG. 4A depicts the SNR loss versus carrier frequency offset.

FIG. 4A shows the SNR loss 80 caused by the carrier frequency offset. The power detect mechanism (as disclosed in the patent application #1) leaves a residual carrier frequency offset. Therefore, the task of the acquisition algorithm of the present invention is to minimize this residual carrier frequency offset in order to maximize probability of maintaining a lock on the acquired signal, to maximize the quality of pseudo range measurement, and to maximize probability of receiving the correctly decoded 50 Baud data.

More specifically, FIG. 4A shows the SNR loss of 4 dB for a frequency offset of 25 Hz for a correlator integration period of 20 milliseconds. Longer correlator integration periods lead to improved SNR but can potentially increase the SNR loss caused by carrier frequency offset. For instance, for a 200 millisecond integration period, there would be the SNR loss of 4 dB at only 2.5 Hz carrier frequency error. The other issue with integrating the correlators coherently across long periods is that 50 Baud data bit transitions can occur every 20 milliseconds. This issue creates the possibility of the signal integrating to zero. Therefore, in practice shorter integration periods (e.g. 10 or 20 milliseconds) are used to avoid this problem.

Figure 4B:
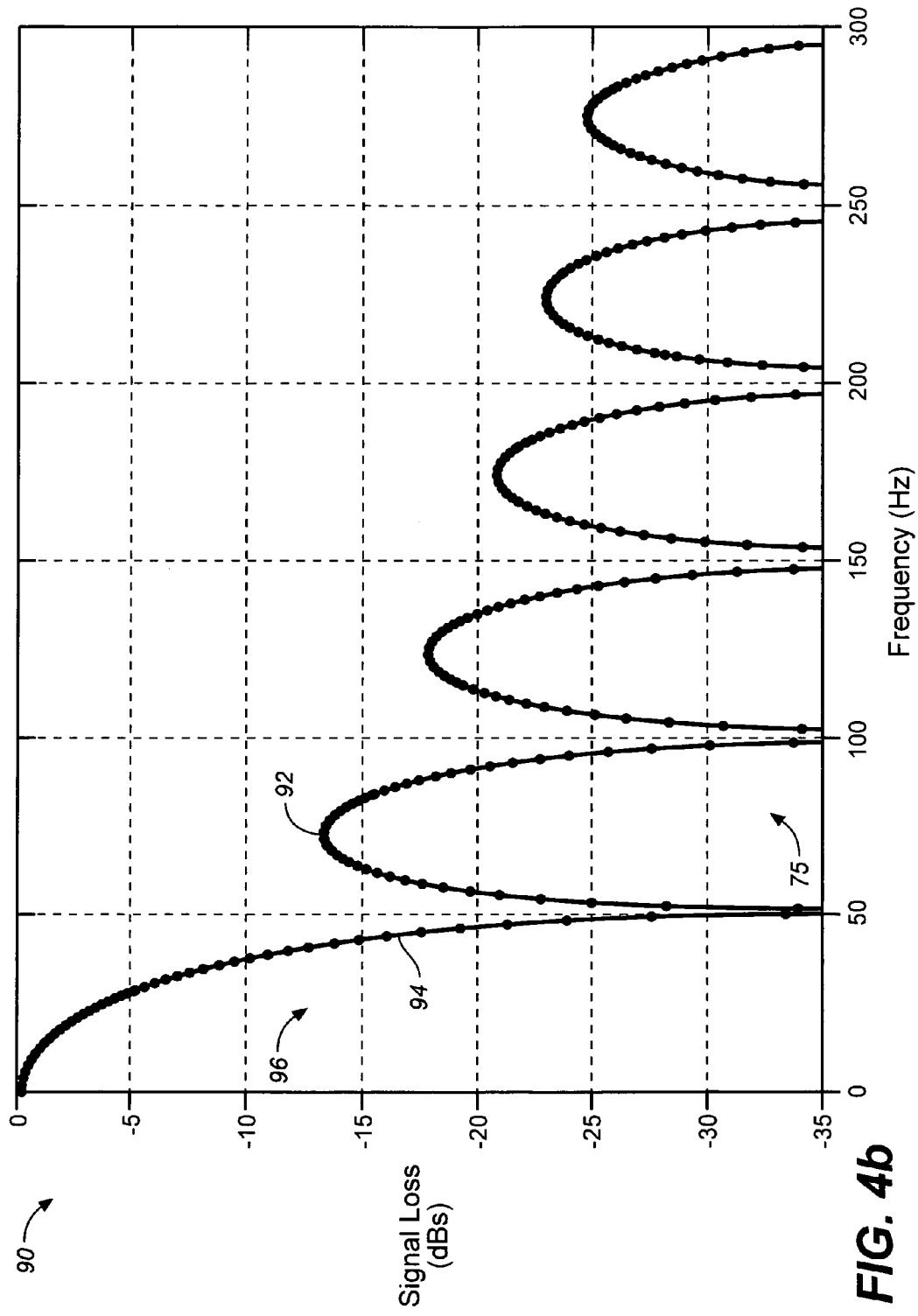
FIG. 4B shows a zoomed out view of the SNR loss caused by the carrier frequency offset.

FIG. 4B shows a zoomed out view 90 of the carrier frequency offset SNR loss. FIG. 4B illustrates that a signal 92 having a frequency offset 75 Hz has signal loss less than a signal 94 having a frequency offset close to 50 Hz. Therefore, the signal 92 located in the sidelobe can be detected easier than the signal 94 located in the main lobe. Therefore, in one embodiment, the algorithm of the present invention is used to avoid locking onto a wrong satellite (having a carrier frequency offset located in a sidelobe) but whose SNR at the antenna is stronger than the SNR of a satellite signal having a carrier frequency offset located in the main lobe). Please, see discussion below.

Figure 5:
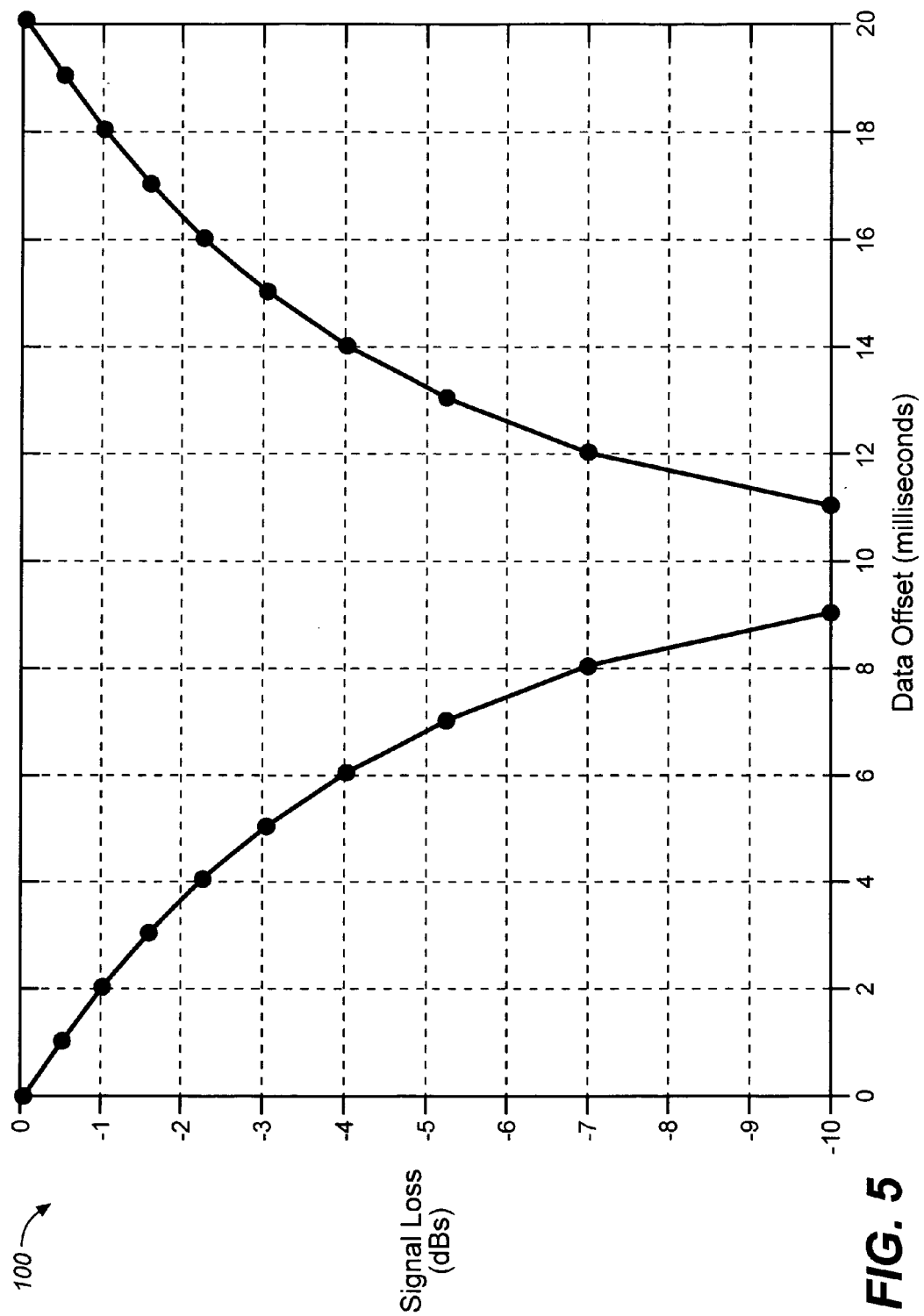
FIG. 5 illustrates the SNR loss versus data time offset.

FIG. 5 illustrates the SNR loss 100 associated with misalignment of the 50 Baud data transition in a 20 millisecond correlator coherent integration period. It shows that in the worst case scenario of a data transition occurring exactly 10 msecs into a 20 msec integration period the signal will cancel. Other misalignments show other SNR loss values. Therefore, in one embodiment, the algorithm of the present invention is used to determine whether the 50 Baud data bit boundary is such that SNR may be optimized, and whether the data bit edge may be used as a timing signal useful in forming the pseudo range measurement. Please, see discussion below.

Figure 6:
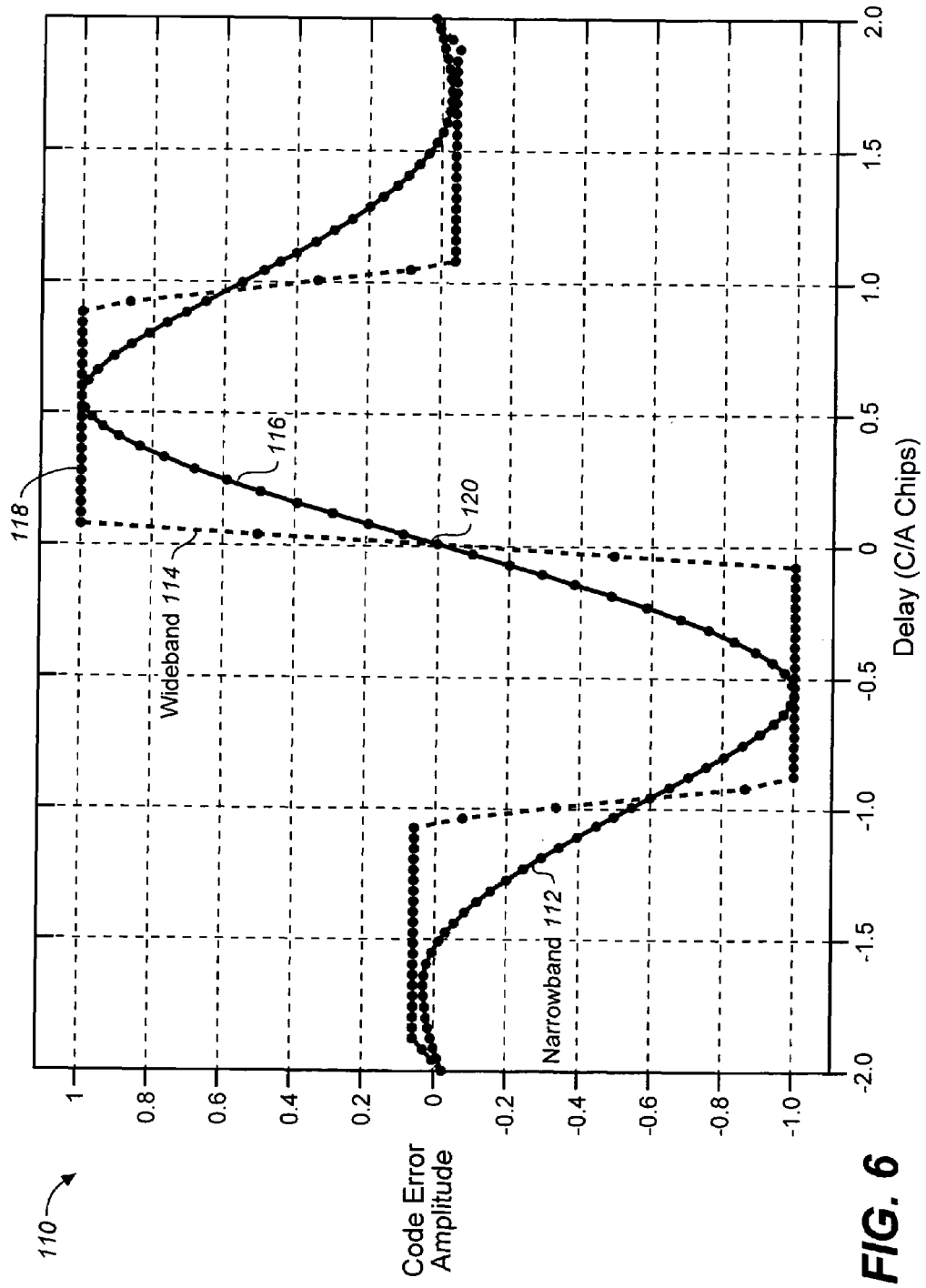
FIG. 6 depicts the code tracking functions for a narrow-band case, and for a wideband case.

FIG. 6 shows the code tracking functions 110, for a narrowband case 112, and for a wideband case 114. The code tracking function typically compares correlations values at different delays (e.g. $I_{C2}$ 56 and $I_{C3}$ 57 of FIG. 2) to estimate what direction the locally C/A code has to be shifted to provide zero code phase offset 120 (0 chips state shown in FIG. 6). The special case of the wideband code tracking function 114 shows a characteristic 118 with largely flat functions with a narrow "tracking" range around 0 C/A chips offset. This is shown here to illustrate the point that in the case of the wideband tracking function that is typically used to improve the quality of the resulting pseudo range, the code phase acquisition has to be within the narrow tracking range around 0 C/A chip because there is no guarantee the tracking algorithm will pull-in to 0 chips if it is not. For example, for a point A 118 that lies on a flat region of the wideband code tracking function 114 there is no indication in which direction the code error should be changed in order to close the tracking loop. This places a bound on the accuracy required by the code phase acquisition algorithm. In the narrowband case 112 an offset of, for example, ¼ chip still results in a slope (around the point B 116) that tends towards the 0 chips condition, allowing the code tracking loop to pull-in.

Figure 7:
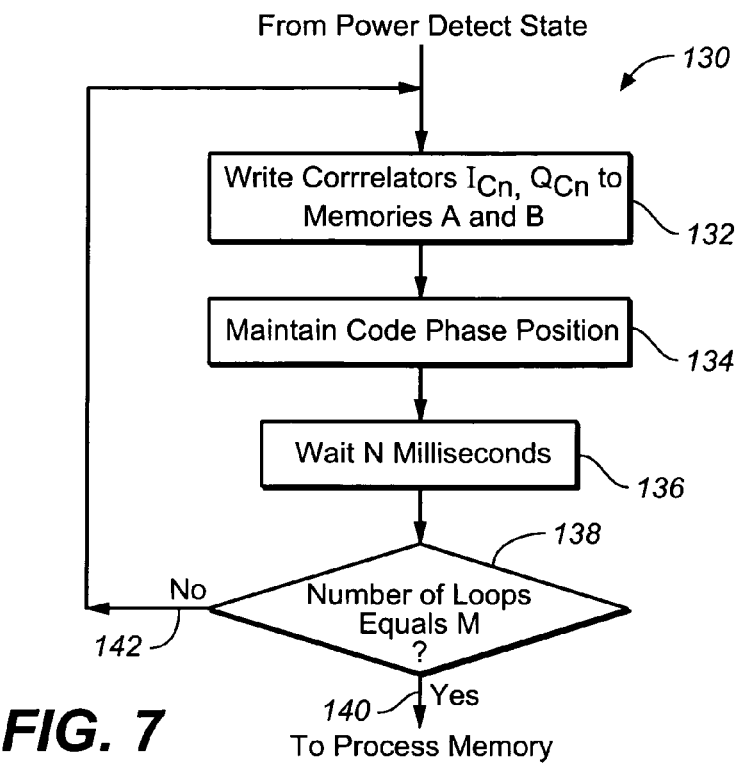
FIG. 7 illustrates the method of the present invention for collecting correlator samples into the Memory A and B blocks.

In one embodiment, FIG. 7 illustrates the method of the present invention for collecting correlator samples into the Memory A and B blocks. The power detect state gives an estimate of carrier frequency and code phase. The carrier frequency is maintained during the memory logging process. The code phase is adjusted via knowledge of the code frequency offset. The code frequency offset is known because it is related to the carrier frequency offset via (Eq. 2):

$$F_{code}=1.023 \times F_{carrier}/1575.42; \quad (Eq. 2)$$

wherein $F_{carrier}$ is the carrier frequency offset given by the power detect process. $F_{code}$ is the expected code frequency offset used to update the code phase during the memory logging process.

The code phase updating process keeps the incoming satellite C/A code and locally generated C/A code relatively stationary during the memory logging process.

Referring still to FIG. 7, at step 132, the $I_{Cn}$ and $Q_{Cn}$ correlators are stored to Memory A and B respectively. At the next step 134, the code phase position is maintained by using (Eq. 2). At the following step 136, there is a wait state of N milliseconds while the new $I_{Cn}$ and $Q_{Cn}$ correlators accumulate over a new N millisecond period. At the next step 138, the total number of $I_{Cn}$ and $Q_{Cn}$ values logged is checked against a value M. If number logged equals M the memory logging process is complete (logical arrow 140), if the number logged is less than M (logical arrow 142) the process is repeated.

In one embodiment of the present invention, the typical values of N and M are 1 and 1000 respectively. With these values the correlators would be coherently integrating across a period of 1 msec, with a total of 1000 of these correlation accumulations being stored to memory. In another embodiment of the present invention, the values of N=5 and M=200 are used to reduce memory capacity requirements.

Figure 8:
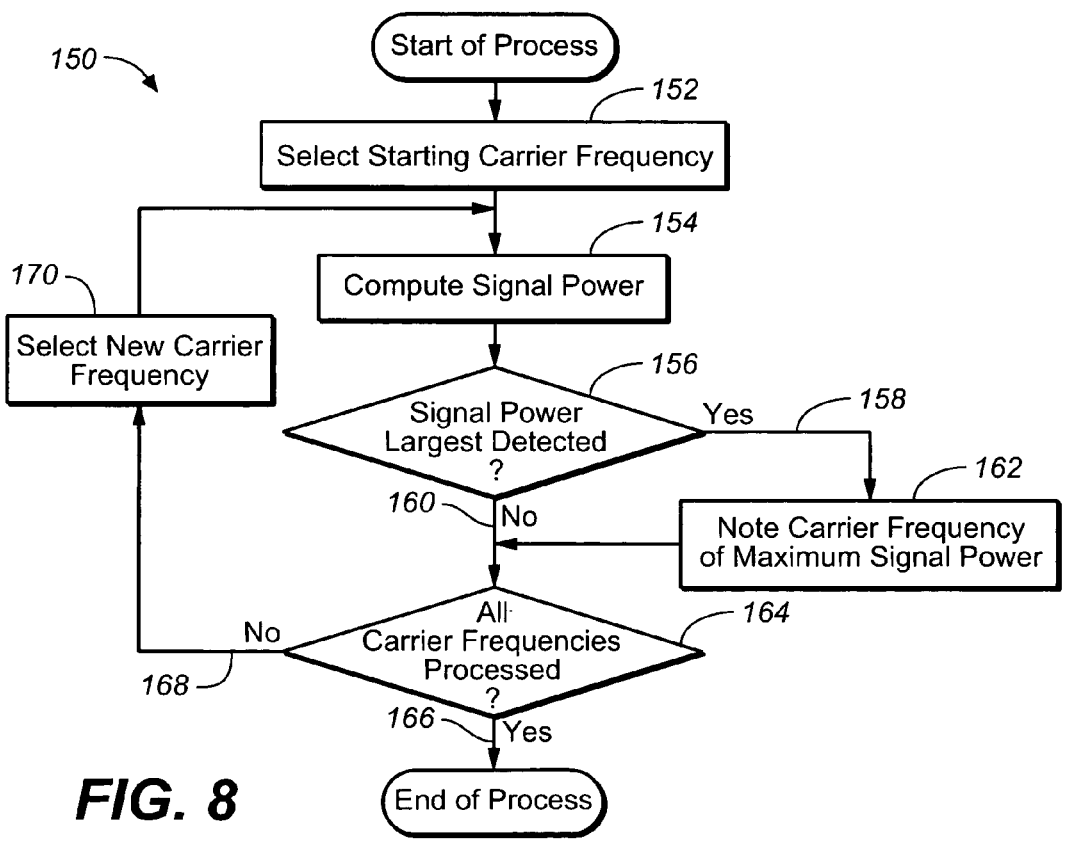
FIG. 8 shows the flow chart of the method of the present invention to prevent the false lock mechanism.

As was stated above, under a number of signal conditions, a strong SNR satellite can be received as a weak one because the carrier frequency is substantially offset. The carrier frequency false lock detection process, shown in the flow chart 150 of FIG. 8, is used to prevent this false lock mechanism. The steps of flow chart 150 of FIG. 8 are as follows. A starting carrier frequency is selected at step 152. This starting carrier frequency can include the carrier frequency estimated from the power detect process or somewhere within a selected range of carrier frequency around the carrier frequency estimated from the power detect process. At the next step 154 the signal power is computed at the selected at step 152 carrier frequency. This can be done by computing $(I_{C2}+Q_{C2})^2$, because the $I_{C2}$ (56 of FIG. 2) and $Q_{C2}$ (55 of FIG. 2) correlators were assumed to be the largest coming out of the power detect process (step 156). The first time through the process loop this first signal power will be the largest and will be noted as the carrier frequency (step 162) at which the largest output power occurred. The next step 164 is performed to check if all carrier frequencies available to try have been tried. If the answer is "yes" (logical arrow 160), the process ends. If the answer is "no" (logical arrow 168), a new carrier frequency is selected (at step 170) and the loop is repeated. The mechanism used to select a new carrier frequency is fully described below.

The method of the present invention shown in the flow chart 150 of FIG. 8 prescribes one to find the maximum y-axis value, or to minimize the SNR of the received satellite signal, as was discussed above in connection with FIG. 4B. More specifically, referring still to FIG. 4B, carrier frequency step sizes used to search should be small enough to not skip over the largest correlation value. According to FIG. 4B, an appropriate frequency step may be 10 Hz. The difference between the main lobe and the sidelobes is at least 13 dB. This helps in selection of an optimum step size. Indeed, a larger step size allows the false lock detect process to be computed more rapidly. On the other hand, the finer frequency steps may be used to determine a better estimate of the true carrier frequency offset. At any rate, the optimum frequency step size benefit is limited by noise, hence beyond a noise-limited optimum frequency step size there is no additional benefit.

By using an optimum small frequency step size search, one can find a carrier frequency estimate that is sufficiently adequate to begin a carrier tracking, whereas an improved carrier frequency estimate is provided by successively approximating the carrier frequency, code phase and data transition offsets, as it is fully described below.

An important aspect of the present invention is the near optimal determination of carrier frequency, code phase and data transition offsets. These three SNR loss causing offsets have been described in the present disclosure as the independent loss sources. An important aspect of the present invention is to successively estimate better and better estimates of these offsets. Essentially this involves estimating and correcting for one of the offset, then estimating the others and correcting for those, then going back and re-estimating the first offset source. Having the correlation values stored in memory facilitates this process and provides an important advantage. Indeed, the advantage is that each of the successively improved algorithm estimates operates on the same portion of the GPS signal. This is important because significant signal variations are possible. These variations can occur because of environmental variation of signal levels (received signal can vary significantly over short time periods, especially if the receiver is mobile). Another source of significant variation is the randomness of the satellite transmitted 50 Baud data bits. Indeed, because the correlator outputs can vary depending on whether data transitions have occurred or not, the data transitions will be different in another time sequence of received signals.

Algorithms operating on the logged memory data samples can be significantly faster than if the algorithm had to wait for another set of satellite samples to arrive. This means that a faster Microprocessor block (18 of FIG. 1) can result in an optimized acquisition performed more rapidly, leading to better user experience with faster available position fixes and lower power consumption.

As was stated above, the ability to process the collected memory stored correlator samples for different carrier frequencies is an important aspect of the present invention. In a given above example, a correlation memory period lasted about 1 msec, and 1000 of these correlator sets were stored for further processing. The 1 msec value of the correlation memory period allows a wide range of carrier frequencies to be computed from the samples and also allows different integration periods to be computed on the samples. The carrier frequency range can be 100 s of Hz either side of the power detect carrier frequency estimate.

Figure 9:
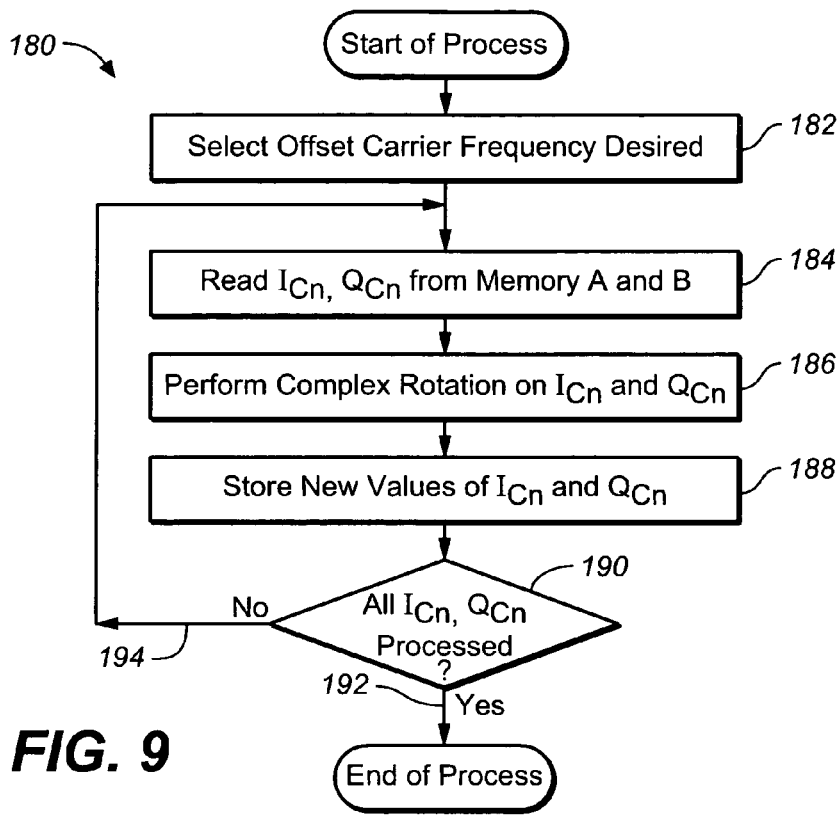
FIG. 9 illustrates the flow chart of the method of the present invention describing the carrier frequency changing process.

In one embodiment, FIG. 9 illustrates the flow chart 180 of the method of the present invention describing the carrier frequency changing process. The first step 182 is to select the desired carrier frequency offset from the carrier frequency of the data stored in Memory A and B. For example, one can select to offset the carrier frequency by 10 Hz. At the next step 184, the current samples in memory $I_{C_n}$ and $Q_{C_n}$ are read by the Microprocessor. The next step 186 is to perform a complex mix operation on the read values. At the step 188, the result of the complex mix operation is stored in the memory locations the values $I_{C_n}$ and $Q_{C_n}$ originally were read from at step 184. The next step 190 is to check if all samples in the memory have been processed. If the answer is 'yes' (logical arrow 192), the carrier frequency changing process ends. If, on the other hand, the answer is 'no' (logical arrow 194), the carrier frequency changing process continues.

Thus, in one embodiment of the present invention, the loop process (illustrated by the flow chart 180 of FIG. 9) essentially takes samples in memory at one carrier frequency and replaces them with samples at another selected carrier frequency.

In another embodiment of the present invention, the result of the complex mix step 186 (of FIG. 9), rather than replacing the original $I_{C_n}$ and $Q_{C_n}$ values in memory, is further processed by using another algorithm of the present invention. In this way the same memory values may be processed over and over to give different results based on different carrier frequencies, different data bit integration timing and different code phase offsets. The advantage of preserving the original memory contents is that quantization errors due to repeated signal processing operations do not grow. The same approach is applicable to the carrier frequency false lock detect process shown in previously described flow chart 150 of FIG. 8.

Figure 10:
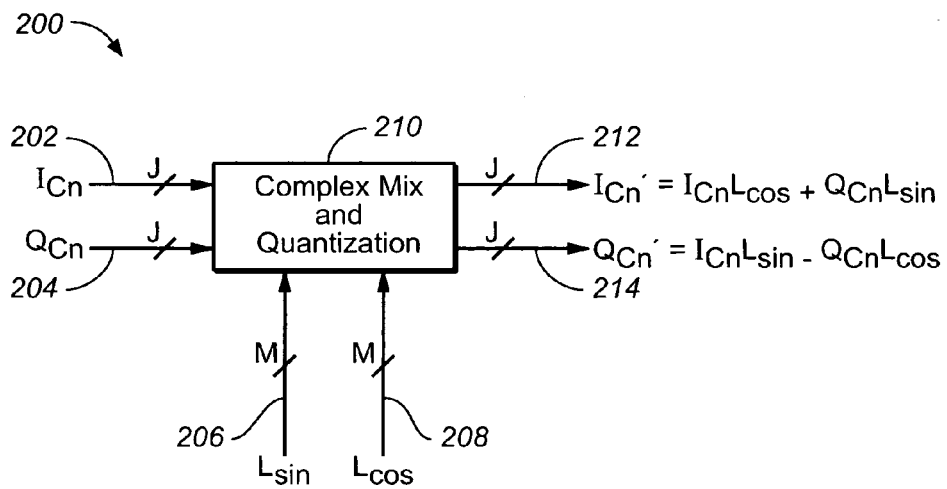
FIG. 10 shows the complex mix step of FIG. 9 in more details.

In another embodiment of the present invention, FIG. 10 shows the complex mix step 186 of FIG. 9 in more details. More specifically, the read from the memory values $I_{C_n}$ 202 and $Q_{C_n}$ 204 are combined with local carrier signals $L_{sin}$ 206 and $L_{cos}$ 208 in the Complex Mix and Quantization block 210. The outputs $I_{C_n}'$ 212 and $Q_{C_n}'$ 214 represent the values of $I_{C_n}$ 202 and $Q_{C_n}$ 204 with changed carrier frequency. The Complex Mix and Quantization block 210 generates the output values $I_{C_n}'$ 212 and $Q_{C_n}'$ 214 by using only multiply, add and subtract operations. The local carrier signals $L_{sin}$ 206 and $L_{cos}$ 208 are designed to represent in-phase and quadrature versions of a carrier signal whose frequency is the desired offset frequency from that present on the input samples $I_{C_n}$ 202 and $Q_{C_n}$ 204. $L_{sin}$ and $L_{cos}$ may be generated real-time, i.e. via an additional step before complex mix step 186 of FIG. 9, or by pre-computed representation in another memory device. It is relatively simple to generate the real-time values of $I_{C_n}'$ 212 and $Q_{C_n}'$ 214 as they are based on the familiar sine and cosine mathematical functions.

Figure 11:
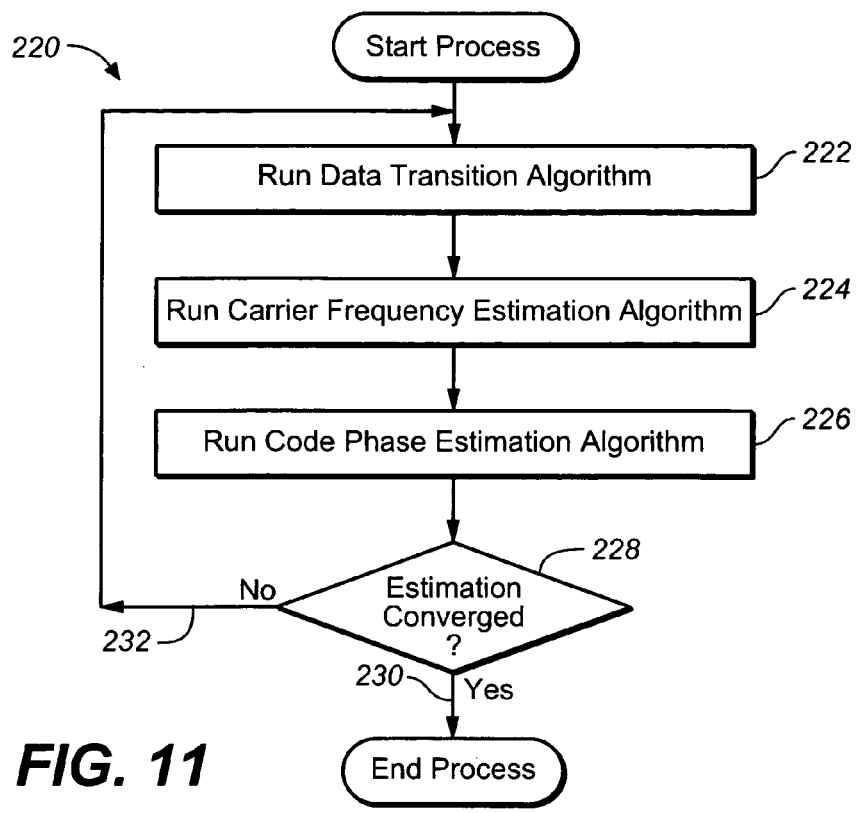
FIG. 11 depicts a flow diagram of the method of the present invention for the satellite signal acquisition process.

In one embodiment of the present invention, FIG. 11 shows a flow diagram 220 of the satellite signal acquisition process including the data transition algorithm applied at step 222 to minimize the data bit misalignment parameter, the carrier frequency estimation algorithm applied at step 224 to minimize the carrier frequency offset parameter, and the code phase offset estimation algorithm applied at step 226 to minimize the code phase offset. The general concept involved is to run each algorithm such that during the next time through the process loop each algorithm will get the benefit of the result of other algorithms. If estimation converges (step 228), that is each parameter selected from the group consisting of: {the carrier frequency offset; the code phase offset; and the data bit misalignment} converges on the corresponding minimized parameter selected from the group consisting of: {the minimized carrier frequency offset; the minimized code phase offset; and the minimized data bit misalignment}, the acquisition process ends (logical arrow 230). If estimation does not converge (logical arrow 232), the steps (222-228) are preferably repeated.

As an example let's assume the power detect process resulted in a carrier frequency offset of 20 Hz, a data bit transition offset of 8 msecs and a code phase offset of ¼ chip. FIG. 5 shows the potential SNR loss associated with the 8 msecs data bit transition offset when the I and Q samples are coherently integrated across a 20 msec period. The first time through the process loop of FIG. 1 the data transition time is estimated, an example may be that its offset estimate is improved to only 1 msec. This new data bit transition estimate is then used by the carrier frequency estimation algorithm when forming coherent integration accumulations for the second step of FIG. 11. Hence we have improved the SNR available for step 224 by improving the data transition estimate via step 222. Similarly, the improved carrier frequency estimate from step 224 when combined with the SNR improvement from step 222, improves the SNR available at step 226 after applying the code phase estimation algorithm. Step 228 is used to determine if the acquisition process should be repeated. Step 228 may involve just repeating the loop a fixed number of times (e.g. loop 3 times), or may involve estimating the convergence of the results. For example, convergence may be determined if the data transition algorithm gives the same msec result as the previous loop, the carrier frequency estimate is similar to the previous loop and the code phase estimate is similar to the previous loop.

In the given above example, the first data transition algorithm performed at step 222 resulted in a 1 msec error in data transition. The second pass through the process loop may result in further removing this 1 msec error (to 0 msecs) because now the data bit transition algorithm is able to operate on an improved SNR created by steps 224 and 226 of the first loop. This successive improved approximation process works well for low SNR signals where initial offset parameter estimates may be noisy.

As a result of the acquisition process 220 of FIG. 11, the optimal estimates are available for the three main errors sources. This provides for the best conditions for making a measurement (e.g. pseudo range measurement) and for transitioning to a tracking state where the parameters are continuously estimated and updated as the satellite moves. Please, see discussion below.

A number of variations of the acquisition process 220 of FIG. 11 are possible. For example, the order in which the steps 222 and 224 are performed may be reversed. Step 226 may be taken out of the loop and can performed prior to the end of the acquisition process 220 of FIG. 11.

Figure 12:
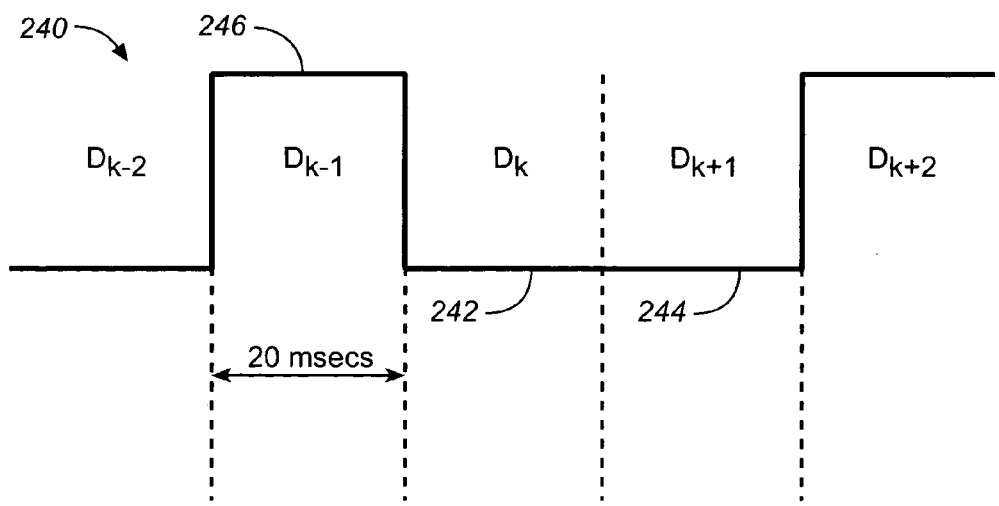
FIG. 12 illustrates the 50 Baud data transitions in the satellite signal data stream.

In one embodiment of the present invention, FIG. 12 illustrates the 50 Baud data transitions in the satellite signal data stream 240. Data bit transitions occur approximately 50% of the time in a random data stream. The data bit edge can be one of 20 positions, corresponding to a plurality of offset values, from 0 through 19. The goal is to estimate where the data bit transition occurs such that subsequent coherent integrations, used by carrier frequency and code phase estimate algorithms, can be performed exactly across the 20 msec bit period. In one embodiment of the present invention, since Memory A and B store 1 msec correlation samples, the result of the data bit transition algorithm is an estimated value of the data bit transitions offset, that can be any offset from 0 through 19, from the start of the Memory A and B starting addresses.

More specifically, in one embodiment of the present invention, the data transition algorithm computes the power of the difference in value between successive 20 msec accumulations, for all 20 possible data transition offset values, across the entire correlator data set stored in Memory A and B.

The data transition algorithm computes the values power of $(D_k-D_{k-1})$ for all 20 possible data positions. This operation is repeated for the entire data set stored in Memory A and B such that the power of $(D_k-D_{k-1})$ values are summed with like positioned values previously computed. As we have I and Q 1 msec samples stored in memory the $D_k$ components are computed separately as $I_{C2k}-I_{C2k-1}$ and $Q_{C2k}-Q_{C2k-1}$, where the $I_{C2k}$ value is summed across 20 successive memory locations. The power is computed by taking the sum of the squares of the I and Q results. This process results in 20 values, one for each data bit offset, after all Memory A and B samples have been processed. The above described data transition detection algorithm of the present invention is capable of canceling or enhancing the signal content based on the presence or on the absence of a data transition.

Figure 13:
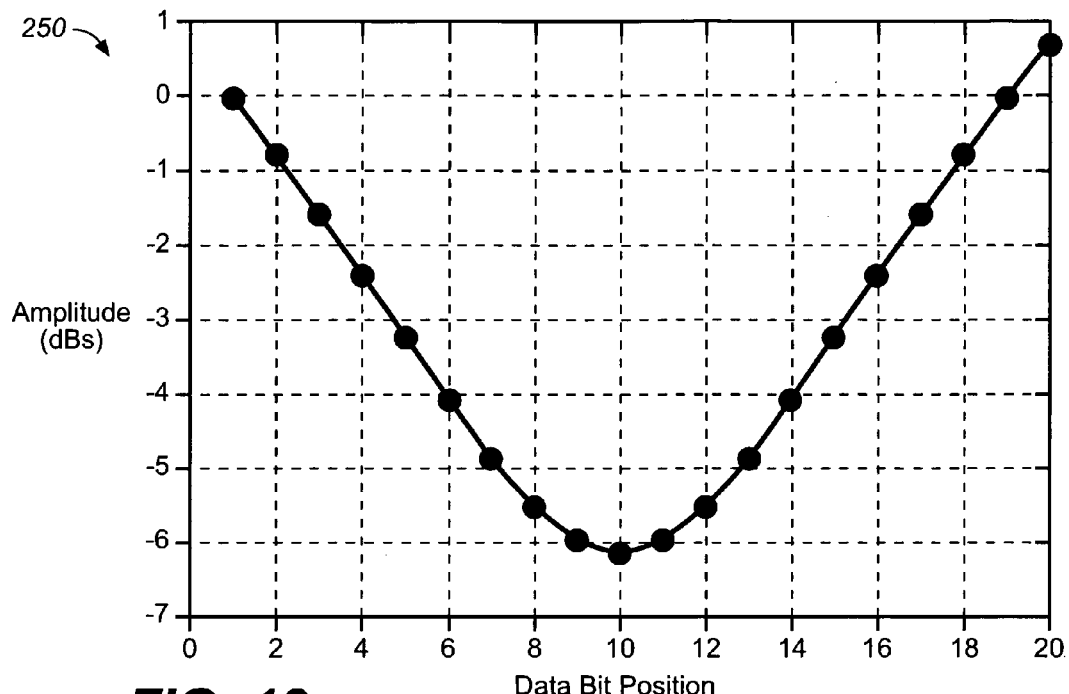
FIG. 13 is an illustration of the resulting 20 values of data bit offsets after the data transition detection algorithm of the present invention is performed.

FIG. 13 is an illustration 250 of the resulting 20 values of data bit offsets after the described above data transition detection algorithm of the present invention is performed. FIG. 13 shows the relative amplitude difference in decibels between the data bit offset possibilities, with a maximum for the algorithm at data position 20. According to FIG. 13, the maximum result is achieved if the data transition is correctly aligned. This is due to the fact that if there is no transition (e.g. between $D_k$ 242 and $D_{k+1}$ 244 of FIG. 12) the algorithm differences the signal to zero, and if there is a transition (e.g. between $D_{k-1}$ 246 and $D_k$ 242 of FIG. 12), the result gets larger because the signal doubles. An offset in data bit transition causes the signal to be amplified to less than double.

Referring still to FIG. 11, the code phase estimation algorithm (step 226 of FIG. 11) operates on all Memory A and B. The Memory A and B 1 msec values are accumulated using 20 msec periods across the entire Memory A and B samples. For N=1, M=1000, there will be 50 20 msec accumulations formed. The power of the 20 msec accumulations is computed by calculating the sum of squares of the respective I and Q 20 msec accumulations. For example, referring to FIG. 2, three power summations are formed, one for the power calculated from 20 msec accumulations of $I_{C1}$ 51 and $Q_{C1}$ 53, the other two from $I_{C2}$ 56, $Q_{C2}$ 55 and $I_{C3}$ 57 and $Q_{C3}$ 59 accumulations. Three signal vectors are formed by taking the square root of the three power summations. Let's call the resulting signal vector summations $V_{C1}$, $V_{C2}$ and $V_{C3}$. These signal vector summations $V_{C1}$, $V_{C2}$ and $V_{C3}$ represent estimates of the signal vector amplitude at various time delays between incoming satellite C/A code and locally generated C/A code. The code phase offset is estimated from these V values by plotting the value of $G=(V_{C1}-V_{C3})/V_{C2}$ (peak equation) against code phase offset. Another way of expressing the value of G is to say that it is formed from an early minus late over punctual estimates of the correlation function. With reference to the acquisition process of FIG.

11, the code phase estimate can be further improved as the acquisition process loop converges, as was stated above.

Figure 14:
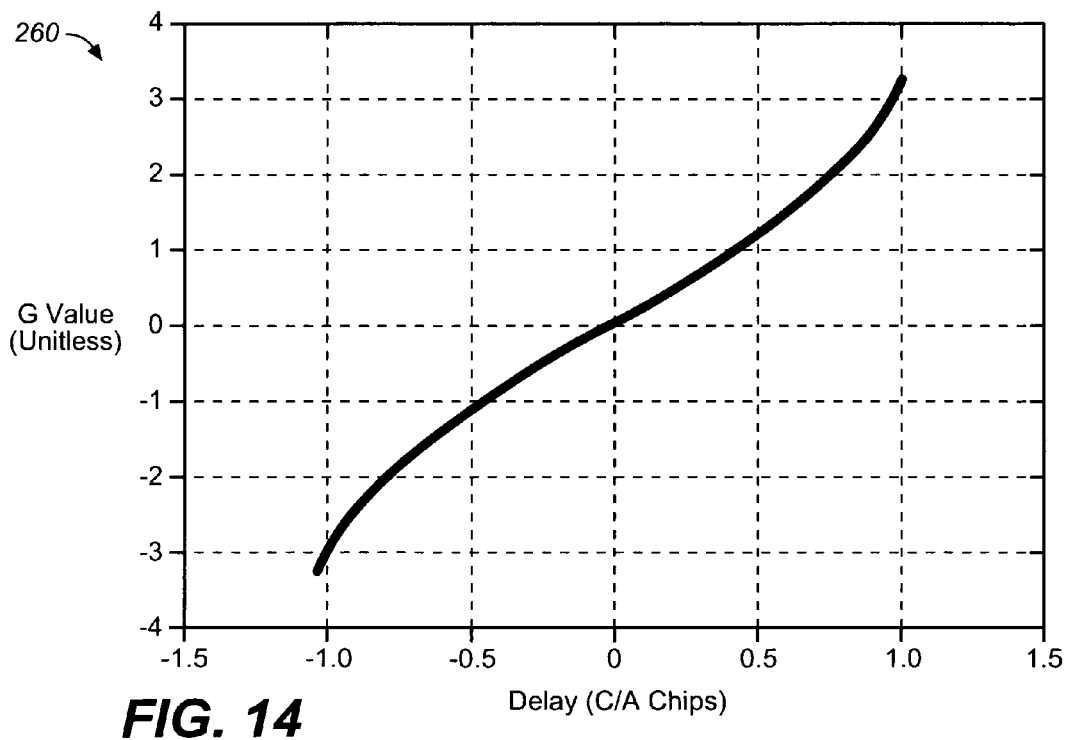
FIG. 14 is an example of the value of G plotted against the code phase offset.

FIG. 14 is an example 260 of the value of G plotted against the code phase offset (solution of the peak equation). The code phase offset algorithm computes G as described above then uses the function that relates G to the code phase offset. This function may be stored as a look-up table in the Microprocessor memory or stored in program memory as a polynomial approximation to the function 260 of FIG. 14.

The disclosed above method of the present invention for computing code phase offset is also useful in measuring the pseudo range. Indeed, the pseudo range is a measure of the time of arrival of the GPS signal that is subsequently used for the position fix calculation. Therefore, the disclosed above method of the present invention for computing code phase offset is useful because it does not require that a code tracking loop be locked to find the peak of the code correlation function (the code correlation function peak is the signal timing arrival signature used in measurements). Instead, the position of the peak of the correlation function is estimated using the computed code phase offset.

Referring still to FIG. 11, the carrier frequency estimation algorithm performed at step 224 assumes that the carrier frequency error is within the main lobe 96 of FIG. 4B. The carrier frequency false lock process described previously is run to ensure that this is the case.

More specifically, in one embodiment of the present invention, the carrier frequency offset is estimated by accumulating the I and Q memory samples across 20 msecs. The I and Q correlations closest to the correlation peak ($I_{C2}$ 56 and $Q_{C2}$ 55 of FIG. 2) are used as they represent the correlations with maximum SNR available. The phase of the carrier signal is estimated using the function $\tan^{-1}(Q/I)$, where Q and I are the $Q_{C2}$ and $I_{C2}$ values accumulated over 20 msecs. The frequency is estimated by difference sequential carrier phase measurements. These frequency estimates are then processed over the entire data set stored in Memory A and B, effectively taking the average of a number of carrier frequency measurements. The resulting carrier frequency offset value (output of step 224 of FIG. 11) is used for subsequent algorithms, including the code phase estimate and any data transition algorithms that follow, as was explained above.

An interesting aspect of the described above carrier frequency estimate algorithm of the present invention is that the further it is offset the less it is accurate, which is true for a signal having low SNR in the presence of large noise. This is due to the fact that because as the frequency offset and noise grows there is more chance of a 'wrong frequency estimate' being made due to crossing a +/−90° data boundary. An advantage of the present invention is that a perfect carrier frequency estimate is not required, as long as the estimate tends towards convergence. As an example, the carrier frequency estimate may give a result of 6 Hz offset when in reality the offset is 15 Hz. The second time the algorithm is run the actual offset will be 9 Hz and the new estimate may be 7 Hz, the third time the process loop is run the accuracy will be improved (e.g. within 1 Hz) such that no more process loops are required. Hence the invention solves the fundamental problem of estimating carrier frequency offset in low SNR conditions.

With the carrier frequency offset converged (step 228 of FIG. 1) the carrier frequency is known accurately enough to close a carrier tracking loop.

The invention described so far has shown how to optimally estimate data transition, carrier frequency and code phase offsets. A modified but similar process may be successfully used to effectively track a low SNR signal.

Figure 15:
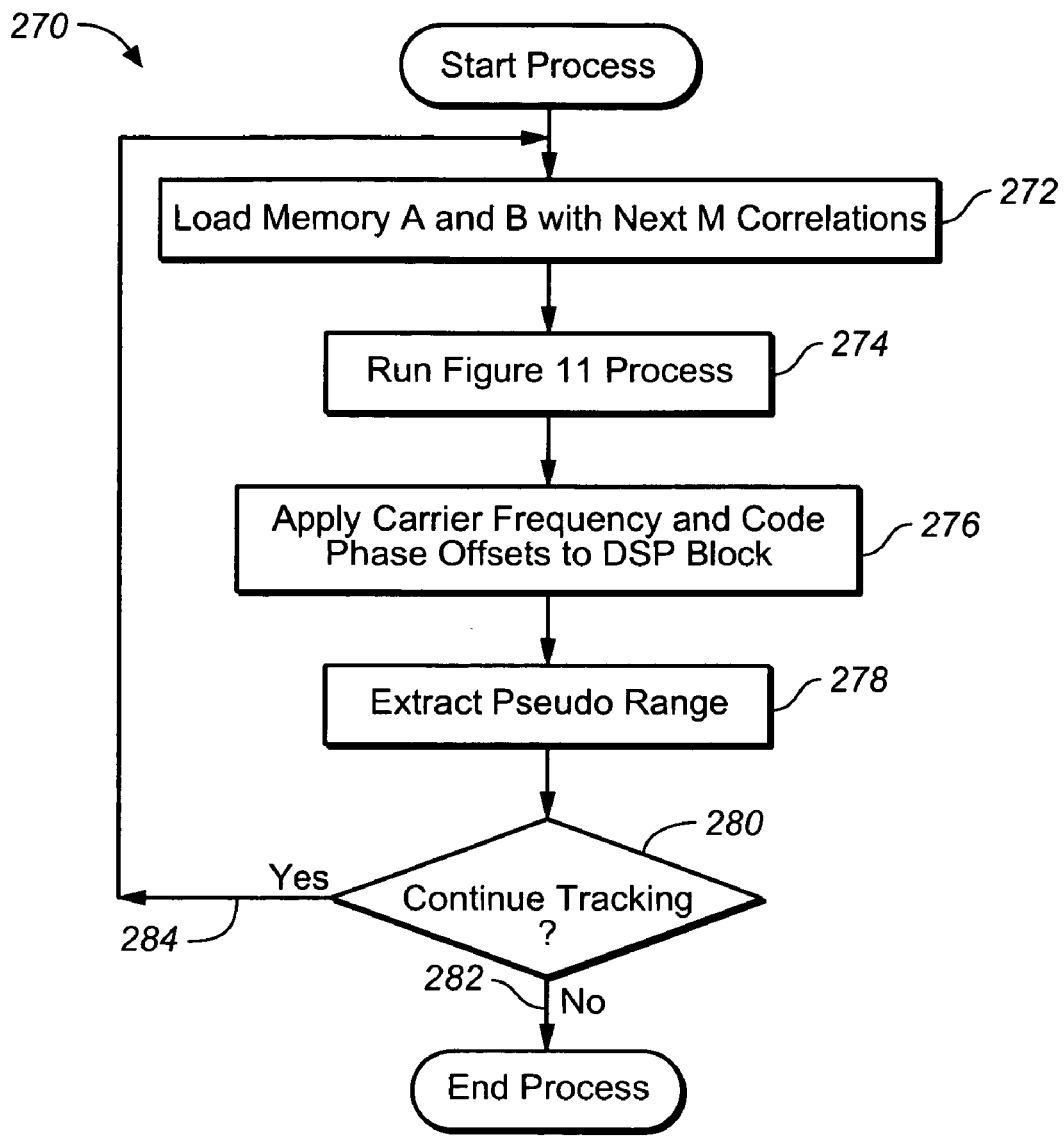
FIG. 15 shows a tracking flow diagram of the present invention that is used to track a satellite.

More specifically, in one embodiment of the present invention, FIG. 15 shows a flow diagram 270 that describes the method of the present invention for tracking a satellite. The new signal tracking method uses regular parameter offset estimates to loosely track the signal rather than the prior art individual code and carrier tracking loops.

More specifically, FIG. 15 shows the A and B Memory block being filled with new values from the Digital Signal Processing block (16 of FIG. 1) every 1 second (for example) (at step 272). At the next step 274, the method of acquisition of the satellite signals fully described above in flow chart 220 of FIG. 11 is run on these newly collected correlation values in memory. The resulting carrier frequency and code phase estimates found at step 274 are then applied to carrier and code NCOs in the Digital Signal Processor block (16 of FIG. 1) at step 276 of FIG. 15. In this way the $I_C$ and $Q_C$ correlation values will continue to be close in carrier frequency and code phase to the corresponding values of the acquired satellite signal thus allowing to effectively track the acquired satellite signal. The additional step 278 is performed to extract the pseudo range measurement from the data included in the acquired and tracked satellite signal.

This pseudo range measurement is actually a by-product of the code phase estimation process, as was described above.

Although the data transition algorithm is run at step 222 of FIG. 11 during the acquisition phase, it is also advantageous to run the same data transition algorithm during the tracking phase (flow chart 270 of FIG. 15) because it allows further confidence that the data transition result is correct.

The present invention is not limited to the disclosed above embodiments. More specifically, in one embodiment of the present invention, it is possible to reduce the memory required for Memory A and B by storing correlations integrated over 20 msecs if data transition time is already known. In this embodiment of the present invention, the step 222 of data transition algorithm of FIG. 11 should be omitted. It is also possible to reduce the overall receiver memory requirements by sharing the Memory A and B with other receiver functions, for example, with the memory used by the power detect process if the memory used by the power detect process and the Memory A and B used by the method of the present invention are not required at the same time.

In another embodiment of the present invention, if the data transition time is not known, a period other than 1 msec may be used when storing correlations in Memory A and B. For example, a period of 2 msecs may be used when storing correlations in Memory A and B, if it is possible to run the data transition algorithm under these conditions.

In one more embodiment of the present invention, the coherent integration time used to form accumulations from multiple entries in the Memory A and B block could be longer or shorter than the 20 msecs described above.

In one additional embodiment of the present invention, the carrier frequency, code phase or data transition offsets may be estimated using other, less than optimal techniques, but using the same principle of processing the Memory A and B multiple times.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of acquisition a signal having a low signal to noise ratio (SNR), wherein said signal having said low SNR is emanating from a source selected from the group consisting of {a GPS satellite; a GLONASS satellite; a GALILEO satellite; and a pseudolite}, said method comprising the steps of:
   (A) detecting a non-zero power in said signal having said low SNR during a power detect process;
   (B) receiving said signal having said low SNR by using a signal receiver having an antenna;
   (C1) employing an integer N plurality of In phase channel correlators configured to accumulate a plurality of I channel digital samples of an incoming signal in an In phase (I) channel, and employing said integer N plurality of Quadrature channel correlators configured to accumulate a plurality of Q channel digital samples of said incoming signal during a predetermined time period;
   (C2) writing into a first memory block a plurality of I channel digital samples of said incoming signal accumulated during said predetermined time period, and writing into a second memory block s a plurality of Q channel digital samples of said incoming signal accumulated during said predetermined time period to complete a loop cycle of said memory logging process;
   (C3) adjusting a code phase by using an expected code frequency offset deducted from a carrier frequency offset given by said power detect process to maintain a code phase of said incoming signal during said memory logging process;
   (C4) counting a number of completed loop cycles;
   (C5) if said number of completed loop cycles of said memory logging process is less than a predetermined integer number M of loop cycles, repeating said steps (C1-C5);
   (C6) if a number of said completed loop cycles of said memory logging process is equal to said predetermined integer number M of loop cycles, ending said memory logging process;
   and
   (D) employing an algorithm to correct defects in reception of said signal having said low SNR by minimizing a set of parameters selected from the group consisting of: {a carrier frequency offset; a code phase offset; and a data bit misalignment}.

2. A method of acquisition a signal having a low signal to noise ratio (SNR), said method comprising the steps of:
   (A) detecting a non-zero power in said signal having said low SNR during a power detect process;
   (B) receiving said signal having said low SNR by using a signal receiver having an antenna;
   (C) accumulating a plurality of digital samples of said signal within a predetermined period of time;
   (D2,1) selecting a starting carrier frequency;
   (D2,2) computing a starting signal power at said starting carrier frequency;
   (D2,3) selecting a subsequent carrier frequency;
   (D2,4) computing a subsequent signal power at said subsequent carrier frequency;
   (D2,5) comparing said subsequent signal power at said subsequent carrier frequency with a signal power at a preceding carrier frequency and selecting a carrier frequency having the largest signal power;
   and
   (D2,6) repeating said steps (D2,2)-(D2,5) until all carrier frequencies are processed.

3. A method of acquisition a signal having a low signal to noise ratio (SNR), said method comprising the steps of:
   (A) detecting a non-zero power in said signal having said low SNR during a power detect process;
   (B) receiving said signal having said low SNR by using a signal receiver having an antenna;
   (C) accumulating a plurality of digital samples of said signal within a predetermined period of time;
   (D4) running a data transition algorithm to minimize said data bit misalignment parameter;
   (D5) running a carrier frequency estimation algorithm to minimize said carrier frequency offset parameter;
   (D6) running a code phase estimation algorithm to minimize said code phase offset;
   and
   (D7) repeating said steps (D4-D6) until each said parameter selected from the group consisting of: {said carrier frequency offset; said code phase offset; and said data bit misalignment} converges on a corresponding minimized parameter selected from the group consisting of: {said minimized carrier frequency offset; said minimized code phase offset; and said minimized data bit misalignment}.

4. The method of claim 3, wherein said step (D4) of running said data transition algorithm to minimize said data bit misalignment parameter further comprises the steps of:
   (D4,1) determining the power of the difference between adjacent correlations taken over the entire correlator data set stored in a first memory and stored in a second memory;
   and
   (D4,2) summing said power of the difference between said adjacent correlations determined in said step (D4, 1) over all possible data bit positions;
   wherein said data transition algorithm cancels or enhances said received signal based on a presence or on absence of a data bit transition.

5. The method of claim 3, wherein said step (D5) of running said carrier frequency estimation algorithm to minimize said carrier frequency offset parameter further comprises the steps of:
   (D5,1) accumulating the I and Q memory samples across a bit time period;
   (D5,2) selecting the I and Q memory samples closest to a correlation peak;
   (D5,3) estimating the phase of the carrier signal using said I and Q memory samples closest to said correlation peak;
   (D5,4) estimating the frequency of the carrier signal by using difference sequential carrier measurements;
   (D5,5) averaging said carrier frequency estimates across the entire data stored in said first and second memory;
   and
   (D5,6) using the resulting averaged frequency offset value for subsequent data processing.

6. The method of claim 3, wherein said step (D6) of running said code phase estimation algorithm to minimize said code phase offset further comprises the steps of:

(D6,1) accumulating an Early, Punctual, and Late correlator values over a predetermined memory logging time period in both I and Q channels;
(D6,2) computing a correlation vector magnitude for each said Early, Punctual, and Late accumulated correlator values for each said bit period;
(D6,3) summing said correlation vector magnitude for each said Early, Punctual, and Late correlators over said predetermined memory logging time period to compute a peak equation; wherein said peak equation represents an optimized direction and an optimized size of a code phase error;
(D6,4) using said peak equation to compute a code phase error;
and
(D6,5) using said code phase error to achieve an optimized code tracking function.

7. A method of acquisition a signal having a low signal to noise ratio (SNR), said method comprising the steps of:
(A) detecting a non-zero power in said signal having said low SNR during a power detect process;
(B) receiving said signal having said low SNR by using a signal receiver having an antenna;
(C) accumulating a plurality of digital samples of said signal within a predetermined period of time;
(D) employing an algorithm to correct defects in reception of said signal having said low SNR by minimizing a set of parameters selected from the group consisting of: {a carrier frequency offset; a code phase offset; and a data bit misalignment};
(E1) loading a first memory block and a second memory block with a set of current I and Q digital samples of said received signal collected during said predetermined time period;
(E2) running said data transition algorithm to minimize said data bit misalignment parameter; running a carrier frequency estimation algorithm to minimize said carrier frequency offset parameter; and running a code phase estimation algorithm to minimize said code phase offset thus correcting said received signal having said low SNR;
(E3) performing a tracking function of said received corrected signal having said low SNR by applying said minimized carrier frequency offset and applying said minimized code phase offset to a Digital Signal Processing (DSP) block;
and
(E4) repeating said steps ((E1)-(E3)) until said tracking of said received corrected signal having said low SNR is continued.

8. The method of claim 7, wherein said step (E3) of performing said tracking function of said received corrected signal having said low SNR further includes the steps of:
(E3,1) closing a code tracking loop;
(E3,2) closing a carrier tracking loop;
(E3,3) aligning data bit edges;
and
(E3,4) performing a data extraction operation and performing a pseudo range measurement operation by using said received corrected signal having said low SNR.

9. An apparatus for acquisition of a signal having a low signal to noise ratio (SNR), said apparatus comprising:
(A) a means for detecting a non-zero power in said signal having said low SNR during a power detect process;
(B) a means for receiving said signal having said low SNR;
(C) a means for accumulating a plurality of digital samples of said signal within a predetermined period of time;
(D) a means for correcting defects in reception of said signal having said low SNR by minimizing a set of parameters selected from the group consisting of: {a carrier frequency offset; a code phase offset; and a data bit misalignment}; wherein said means (D) for correcting said defects in reception of said signal having said low SNR further includes an algorithm comprising at least the following steps:
(D1) selecting a starting carrier frequency;
(D2) computing a starting signal power at said starting carrier frequency;
(D3) selecting a subsequent carrier frequency;
(D4) computing a subsequent signal power at said subsequent carrier frequency;
(D5) comparing said subsequent signal power at said subsequent carrier frequency with a signal power at a preceding carrier frequency and selecting a carrier frequency having the largest signal power;
and
(D6) repeating said steps (D2)-(D5) until all carrier frequencies are processed;
and
(E) a means for tracking said corrected received signal having said low SNR.

10. An apparatus for acquisition of a signal having a low signal to noise ratio (SNR), said apparatus comprising:
(A) a means for detecting a non-zero power in said signal having said low SNR during a power detect process;
(B) a means for receiving said signal having said low SNR;
(C) a means for accumulating a plurality of digital samples of said signal within a predetermined period of time;
(D) a means for correcting defects in reception of said signal having said low SNR by minimizing a set of parameters selected from the group consisting of: {a carrier frequency offset; a code phase offset; and a data bit misalignment}; wherein said means (D) for correcting said defects in reception of said signal having said low SNR further includes an algorithm comprising at least the following steps:
(D11) running a data transition algorithm to minimize said data bit misalignment parameter;
(D12) running a carrier frequency estimation algorithm to minimize said carrier frequency offset parameter;
(D13) running a code phase estimation algorithm to minimize said code phase offset;
and
(D14) repeating said steps (D11-D13) until each said parameter selected from the group consisting of: {said carrier frequency offset; said code phase offset; and said data bit misalignment} converges on a corresponding minimized parameter selected from the group consisting of: {said minimized carrier frequency offset; said minimized code phase offset; and said minimized data bit misalignment};
and
(E) a means for tracking said corrected received signal having said low SNR.

* * * * *